Figure 1:
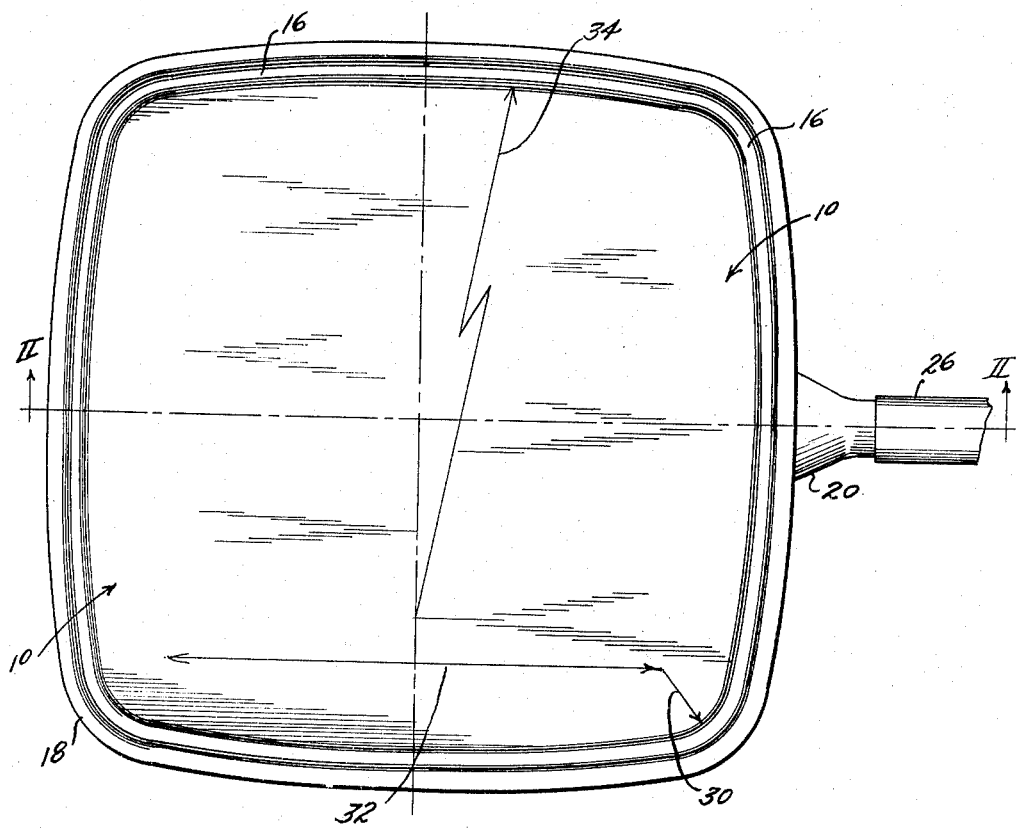

Feb. 13, 1951     T. B. CHACE     2,541,034
FRYING PAN
Filed Dec. 14, 1946

INVENTOR.
Thomas B. Chace
by The firm of Charles W. Hills
Attys.

Patented Feb. 13, 1951

2,541,034

UNITED STATES PATENT OFFICE 2,541,034

FRYING PAN

Thomas B. Chace, Winnetka, Ill.

Application December 14, 1946, Serial No. 716,233

1 Claim. (Cl. 126—390)

My invention relates to frying pans of the type using copper clad steel.

It is well known that the upper or frying surface of a frying pan should be constructed of a material having a high degree of resistance to the corrosion incident to frying operations whereas the frying pan as a whole should have good thermal conductivity so as uniformly to distribute the heat applied thereto and most effectively to transfer the heat from the under surface thereof to the substance being fried. It is especially desirable that good thermal conductivity in the lateral direction across the pan be provided inasmuch as the applied heat is concentrated along the flame or heating element of the stove. One material having these characteristics is copper clad stainless steel which has a good thermal conductivity by reason of the copper portion and a high degree of resistance to corrosion by reason of the stainless steel portion. Typical of this material is the composite metal stock described in my Patent 2,235,200, issued March 18, 1941, which comprises a relatively thin layer of chromium ferrite alloy bonded to a relatively thick layer of copper. In addition this material is relatively inexpensive as it can be manufactured by mass production rolling operations such as those described in my Patent 2,325,659, issued August 3, 1943.

It is further desirable in a frying pan to construct the pan of shape most effectively to utilize the total area of the stove or other unit used for frying purposes. To this end, it is desirable that the pan be of approximately square shape rather than circular shape, thereby covering a square area over the burner and permitting maximum utilization of the stove area.

I have discovered that when a frying pan is constructed of copper clad stainless steel and is shaped to approximate a square, difficulty is encountered due to the tendency of the pan to warp and bend under the rapid temperature variations and large amounts of heat incident to frying operations. This tendency is due to the unequal thermal coefficients of expansion of the metal layers, together with the fact that the heat is not uniformly applied to the under surface of the pan. For these reasons it has heretofore not been possible to provide a frying pan taking advantage of the benefits of copper clad stainless steel while at the same time approximating a square shape to take maximum advantage of the stove area.

It is an object of my invention to provide an improved frying pan of approximately square shape.

Another object of my invention is to provide an improved copper clad stainless steel frying pan approximating a square shape and having a high degree of resistance to warping.

The novel features which I believe to be characteristic of my invention are set forth with particularity in the appended claim. My invention, itself, however, both as to its organization and method of operation, together with further objects and advantages thereof, may best be understood by reference to the following description taken in connection with the accompanying drawing.

Figure 2:
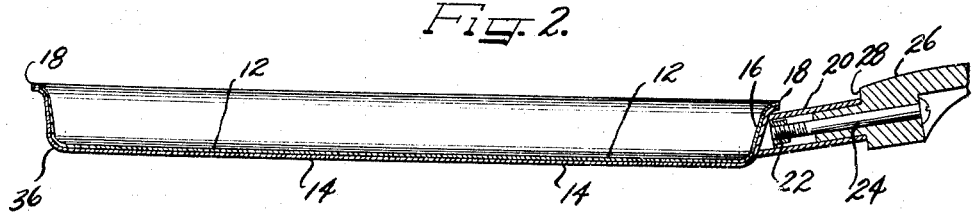

On the drawing:

Figure 1 is a plan view showing a frying pan constructed in accordance with the principles of my invention; and Figure 2 is a cross section view through the line II—II, Figure 1.

As shown on the drawing:

The frying pan consists of a flat frying portion, designated as 10, Figure 1. As shown in Figure 2, the upper or frying surface of the frying portion is of stainless steel, designated as 12, whereas the lower or heating surface is of copper, designated by 14. The pan has an upturned edge 16 terminating in lip portion 18. On one edge of lip portion 18 handle mounting member 20 is brazed, welded, or otherwise attached. This member includes threaded insert 22 having threads to coact with the threaded end of bolt 24. Bolt 24 passes through an opening in handle 26. Handle 26 also contains an edge portion 28 to coact in abutting relationship with handle mounting member 20 to secure a rigid attachment. Handle 26 is preferably constructed of ebonite or similar material having a low coefficient of thermal conductivity to the end that it is cool at all times and permits lifting the frying pan without discomfort.

While copper clad stainless steel provides a high degree of resistance to corrosion on the stainless steel side and good overall thermal conductivity by reason of the copper side, it is subject to warpage and failure by reason of the unequal thermal expansion of the steel as compared to the copper and the unequal application of heat from the stove. In general, the steel tends to expand less than the copper, in some instances undergoing as little as 0.6 of the expansion of the copper. Thus, as the pan is heated, the bottom surface tends to assume an arcuate shape which is concave upward and the copper about the edges tends to break away from the steel. This tendency is so great that warping and breakage occurs in frying pans of this material unless the dimensions of the pan are properly chosen relative to the thickness of the metal.

I have discovered that a frying pan having a high degree of resistance to warping can be made by utilizing the particular shape shown in the drawing, together with copper clad stainless steel having a suitable proportion of copper. It will be observed that while the pan is generally of square shape it is in actuality a combination of curved surfaces. The corners consist of arcs of radius 30 struck about the corners of a square having each side of length 32 whereas the edges are arcuate portions of circles having radius 34. Furthermore, the upturned edge 16 is turned with a definite radius 36, Figure 2.

The exact values of radii 30, 34 and 36, together with the distance 32, may, of course, be varied over a reasonable range without encountering an unreasonable tendency of the pan to warp. As an indication of the approximate values, the following dimensions are typical:

|  | Inches |
|---|---|
| Thickness of copper section 14 | .042 |
| Total thickness of frying portion 10 | .047 |
| Distance 32 | 6.5 |
| Radius 30 | 7/8 |
| Radius 34 | 22 3/16 |
| Radius 36 | 3/16 |

From actual construction and tests I have discovered that a satisfactory frying pan can be made having the above dimensions. However, if the thickness of the copper portion 14 is reduced to, say, .032 inch and the total thickness of frying portion 10 correspondingly reduced to .037 inch, warping has been found to take place.

I am not now able to explain with precision the scientific phenomena responsible for the successful operation of the above described frying pan. In general, however, I attribute this operation to the fact that at no point therein is there any very sharp bend and that the copper is sufficiently thick to withstand the tendency of the steel to pull with respect thereto. In addition, the copper is of thickness to distribute the heat in a uniform manner over the surface of the pan despite the unequal application of heat thereto by the stove.

It will of course be evident that the above dimensions are merely representative and indicate only to an approximate degree the dimensions that may be used in a successful pan. In general, frying pans of all sizes may be constructed by proportioning the dimensions relative to the thickness of the material used. Thus, the dimensions of the pan may be described with reference to the thickness of the base 10 as follows:

Thickness of copper, approximately eight times the thickness of the steel.
Radius 36, approximately four times the total thickness of the frying portion.
Radius 30, approximately nineteen times the thickness of the frying portion.
Distance 32, approximately one-hundred forty times the total thickness of the frying portion.
Radius 34, approximately four-hundred eighty times the thickness of the frying portion.

In general, frying pans of the above-described type can best be constructed by stamping from sheets of copper clad steel. This operation lends itself to mass production with consequent economy of materials and labor.

While I have shown a particular embodiment of my invention, it will of course be understood that I do not wish to be limited thereto since many modifications and alternative constructions may be made without departing from the spirit and scope thereof. In particular, copper clad stainless steel made by processes other than rolling, as for example electro-deposition, may be used. I, of course, contemplate by the appended claim to cover any such modifications as fall within the true spirit and scope of my invention.

I claim as my invention:

In a frying pan, a single dished stamping blanked from sheet material of uniform thickness comprising copper clad stainless steel, the sheet material comprising coextensive copper and stainless steel layers and with the copper being of a thickness substantially greater than the stainless steel, said stamping being in substantially square form and comprising a flat bottom with the side perimeter sections formed on large radius arcs to curve slightly outwardly and the corners curving outwardly on smaller radius arcs, and a continuous upstanding marginal flange bounding said bottom and having round corner walls and slightly outwardly curved side walls between the corner walls generally complementary to the bottom perimeter, the curved side walls and curved corner walls of the flange rigidifying the stamping and resisting warping of the metal layers in said pan bottom and the corner portions of said bottom providing radial heat distribution extensions of the bottom for distributing heat from the central portion of the pan bottom to the flange whereby the pan is substantially uniformly heated and heat warpage of the bottom avoided so that the bottom remains flat at frying temperatures.

THOMAS B. CHACE.

REFERENCES CITED

The following references are of record in the file of this patent:

UNITED STATES PATENTS

| Number | Name | Date |
|---|---|---|
| D. 147,937 | Wemyss | Nov. 18, 1947 |
| 1,881,615 | Isaacson | Oct. 11, 1932 |
| 2,272,609 | Kennedy et al. | Feb. 10, 1942 |
| 2,321,676 | Hennessy | June 15, 1943 |
| 2,325,659 | Chace | Aug. 3, 1943 |

FOREIGN PATENTS

| Number | Country | Date |
|---|---|---|
| 23,519 | Great Britain | of 1913 |